(12) United States Patent
Xu

(10) Patent No.: US 9,016,782 B2
(45) Date of Patent: Apr. 28, 2015

(54) CHILD SAFETY SEAT

(71) Applicant: Max-Inf (Ningbo) Baby Product Co., Ltd., Ningbo, Zhejiang (CN)

(72) Inventor: Lihong Xu, Ningbo (CN)

(73) Assignee: Max-Inf (Ningbo) Baby Product Co., Ltd., Ningbo (CN)

( * ) Notice: Subject to any disclaimer, the term of this patent is extended or adjusted under 35 U.S.C. 154(b) by 0 days.

(21) Appl. No.: 14/109,975

(22) Filed: Dec. 18, 2013

(65) Prior Publication Data

US 2014/0252815 A1  Sep. 11, 2014

(51) Int. Cl.
*A47C 1/08* (2006.01)
*B60N 2/28* (2006.01)

(52) U.S. Cl.
CPC .................................. *B60N 2/2851* (2013.01)

(58) Field of Classification Search
CPC ... B60N 2/2851; B60N 2/4805; B60N 2/4811
USPC .............................................. 297/250.1, 410
See application file for complete search history.

(56) References Cited

U.S. PATENT DOCUMENTS

| 7,780,237 | B2 * | 8/2010 | Chen et al. ..................... 297/397 |
| 7,954,895 | B2 * | 6/2011 | Freeman et al. ........... 297/250.1 |
| 8,845,021 | B2 * | 9/2014 | Hou et al. .................. 297/250.1 |
| 2002/0145318 | A1 * | 10/2002 | Asbach et al. ............. 297/250.1 |
| 2003/0151282 | A1 * | 8/2003 | Williams et al. ........... 297/250.1 |
| 2007/0120403 | A1 * | 5/2007 | Drexler ...................... 297/250.1 |
| 2008/0136232 | A1 * | 6/2008 | Hutchinson et al. ....... 297/250.1 |
| 2013/0320725 | A1 * | 12/2013 | Conway ................... 297/256.11 |

* cited by examiner

*Primary Examiner* — Laurie Cranmer

(57) ABSTRACT

A child safety seat is provided with a backrest including two parallel recesses on a back; a headrest including a sliding plate in the recesses; a cover plate secured to the headrest; an adjustment handle slidably secured to the headrest and including opposite first and second wedges; a belt member fastened between the backrest and the cover plate; spring biased first and second retaining members fastened between the first and second wedges; a first adjustment member pivotably secured to the first retaining member and including first teeth, and a first lever proximate the first wedge; a second adjustment member pivotably secured to the second retaining member and including second teeth, and a second lever proximate the second wedge. The belt member passes between the first teeth and the first retaining member, and between the second teeth and the second retaining member.

6 Claims, 11 Drawing Sheets

CHILD SAFETY SEAT

BACKGROUND OF THE INVENTION

1. Field of the Invention

The invention relates to child safety seats and more particularly to a child safety seat with improved characteristics.

2. Description of Related Art

A child safety seat is designed for the safety of a child seated on a passenger car. Typically, a headrest is provided on a top of a commercially available child safety seat for the purposes of safety, comfort, and protecting a child from injury or death during collisions.

For accommodating children of different heights and adjusting headrest height, China Utility Model No. CN201086654Y published on Jul. 17, 2007 entitled "Height adjustment mechanism for headrest of a child safety seat" discloses a height adjustment mechanism for chair headrest. Its characteristics are that a recess is provided in a support plate, locking slots are biased by a spring, locking blocks are provided, and a locking blocks seat is secured to a backrest so that locking and unlocking of the headrest can be effected. However, its adjustment operation is inconvenient, its structural components are complicated, precision requirements of the recess and the locking slots are relatively high, and its manufacturing is not convenient. Thus, the need for improvement still exists.

SUMMARY OF THE INVENTION

It is therefore one object of the invention to provide a child safety seat having a structurally simple and conveniently operated height adjustment mechanism for its headrest. A downward pushing of the adjustment handle can lower the headrest or an upward pulling of the adjustment handle can lift the headrest in one hand operation. It is very convenient. Further, the headrest of the child safety seat can be positioned in any desired height.

For solving problems associated with the prior art, the invention is provided with a child safety seat comprising a backrest including two parallel recesses longitudinally disposed on a back; a headrest including a downward extending sliding plate slidably disposed in the recesses; a cover plate secured to the headrest; an adjustment handle slidably secured to the headrest and including a first wedge and an opposite second wedge both on a lower portion; a belt member having a bottom end secured to the backrest and a top end secured to the cover plate; first and second retaining members disposed proximate a lower edge of the cover plate and fastened by and between the first and second wedges; a first adjustment member pivotably secured to the first retaining member and including a plurality of first teeth inclined in a first direction, and a first lever proximate the first wedge; a second adjustment member pivotably secured to the second retaining member and including a plurality of second teeth inclined in a second direction opposite to the first direction, and a second lever proximate the second wedge; a first torsion spring pivotably secured to the first retaining member; and a second torsion spring pivotably secured to the second retaining member; wherein the belt member passes between the first teeth and a base of the first retaining member, and between the second teeth and a base of the second retaining member.

Preferably, further comprising two fastening plates, and wherein the fastening plates and the headrest are disposed on the back of the backrest and a front of the backrest respectively, each of the fastening plates have a width greater than that of each of the recesses, and a distance between the fastening plate and the headrest is about equal to a thickness of the backrest.

Preferably, further comprising a back plate for fastening the sliding plate, and wherein the headrest and the back plate are disposed in a front of the backrest and the back of the backrest respectively.

Preferably, further comprising two torsion springs each having one end connected to the adjustment handle and the other end connected to the headrest.

Preferably, the first adjustment member and the first retaining member are pivotably fastened together by a first pivot pin, and the second adjustment member and the second retaining member are pivotably fastened together by a second pivot pin.

Preferably, further comprising a first projection formed on the base of the first retaining member and a second projection formed on the base of the second retaining member.

The invention has the following advantages in comparison with the prior art:

A downward pushing of the adjustment handle can lower the headrest or an upward pulling of the adjustment handle can lift the headrest in one hand operation. It is very convenient. Further, the headrest of the child safety seat can be positioned in any desired height. Furthermore, the headrest is held secure after the height adjustment.

The above and other objects, features and advantages of the invention will become apparent from the following detailed description taken with the accompanying drawings.

DETAILED DESCRIPTION OF THE INVENTION

Figure 1:
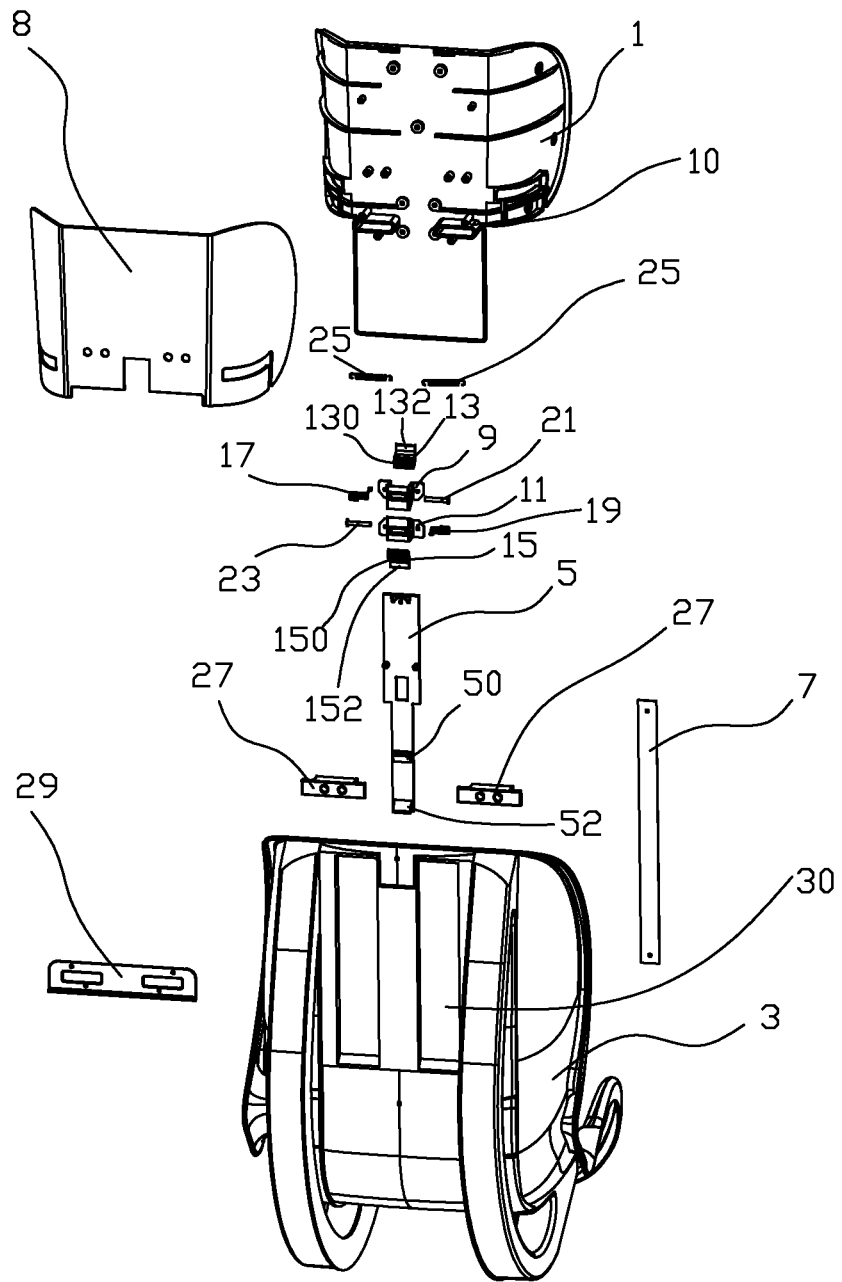
FIG. 1 is an exploded view of a child safety seat having a height adjustment mechanism for its headrest according to the invention.
Figure 2:
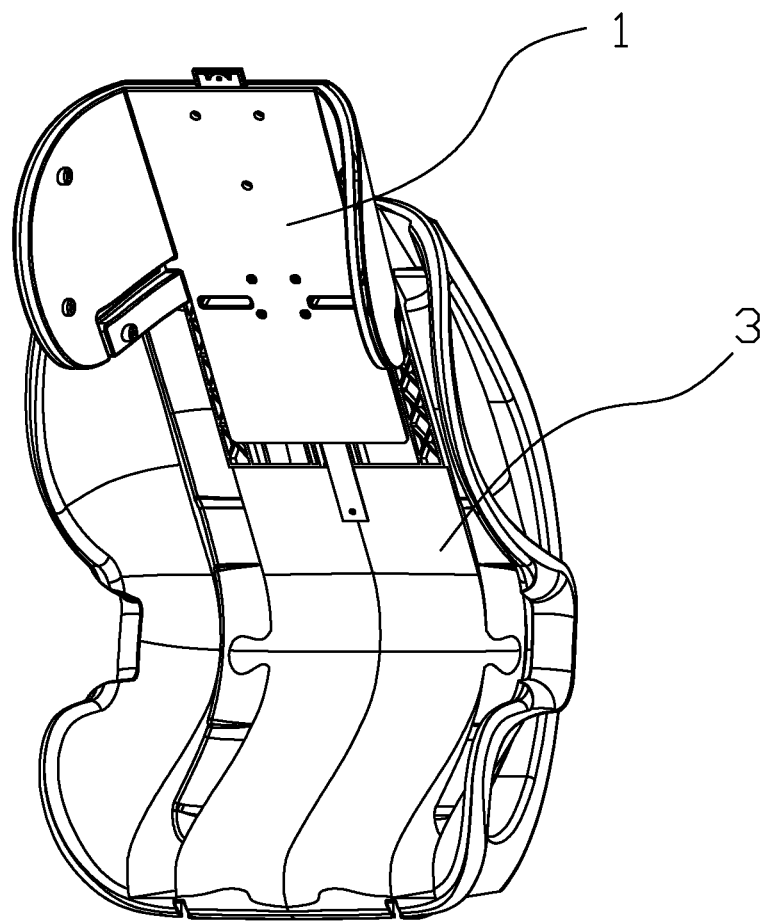
FIG. 2 is a perspective view of the assembled child safety seat.
Figure 3:
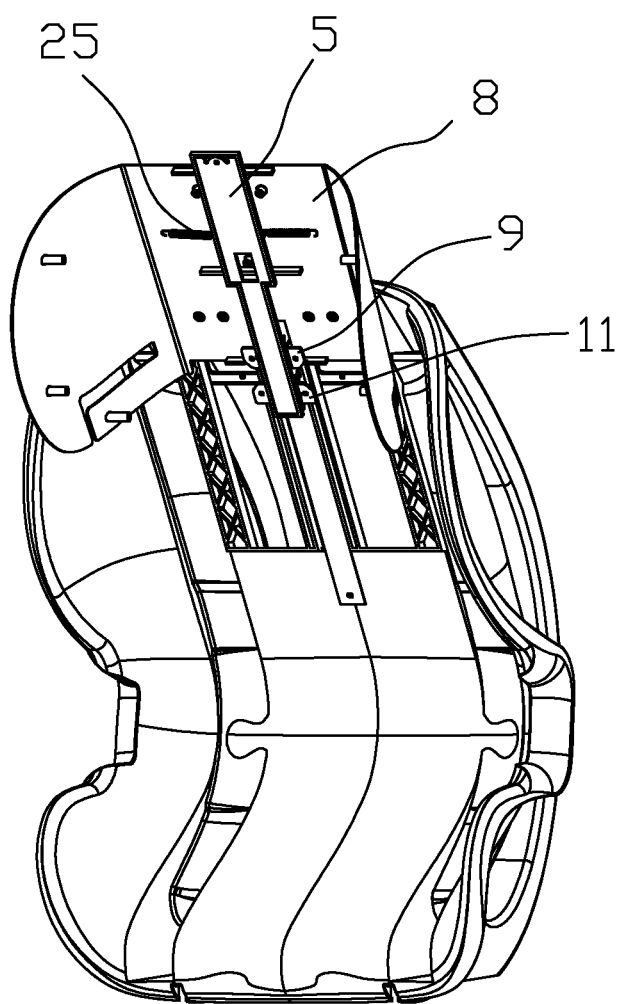
FIG. 3 is a view similar to FIG. 2 with the headrest removed.
Figure 4:
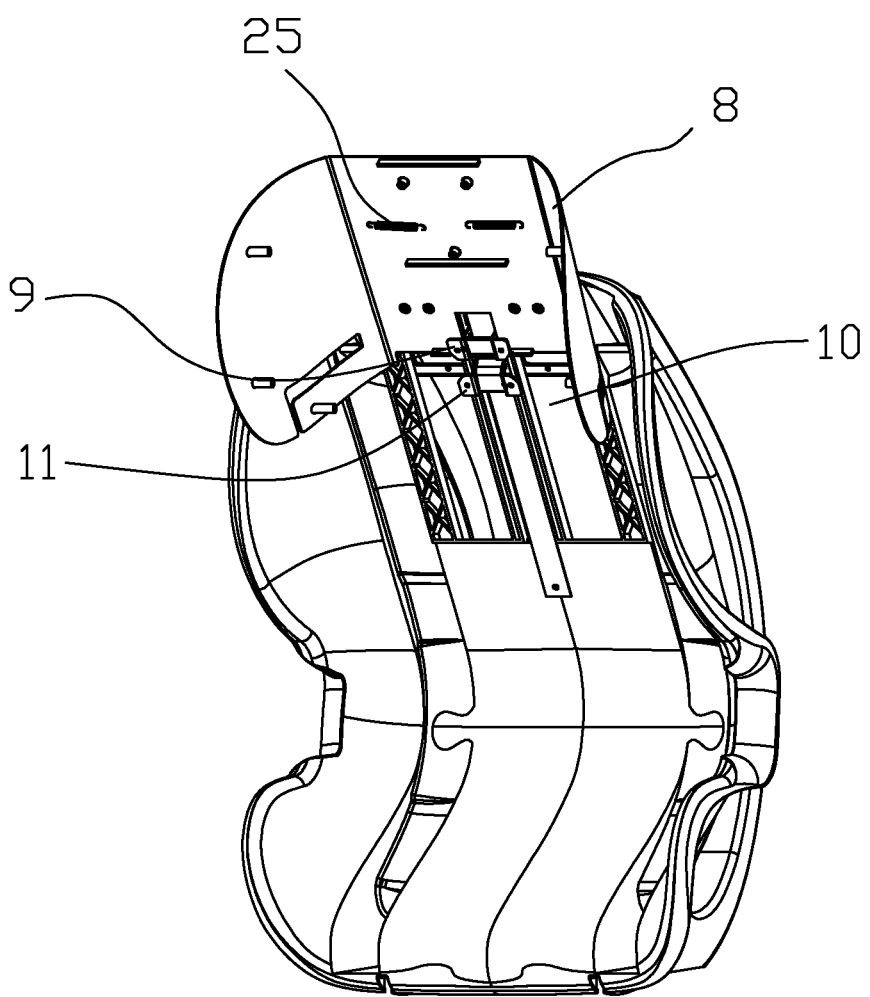
FIG. 4 is a view similar to FIG. 3 with the adjustment handle further removed.
Figure 5:
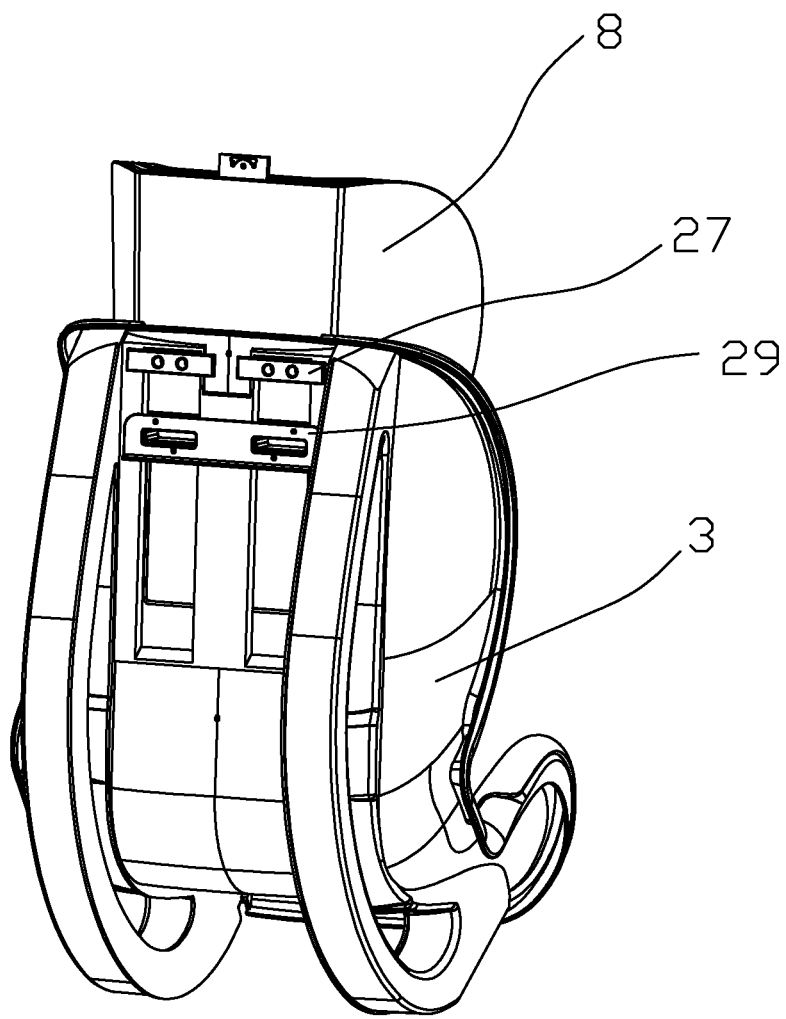
FIG. 5 is another view of the child safety seat opposite to that shown in FIG. 2.
Figure 6:
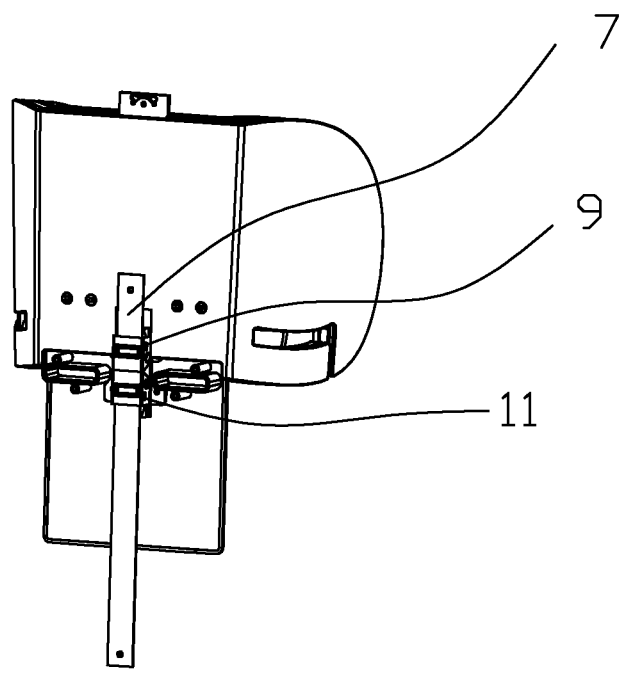
FIG. 6 is a perspective view of the assembled headrest, the belt member, and first and second retaining member.
Figure 7:
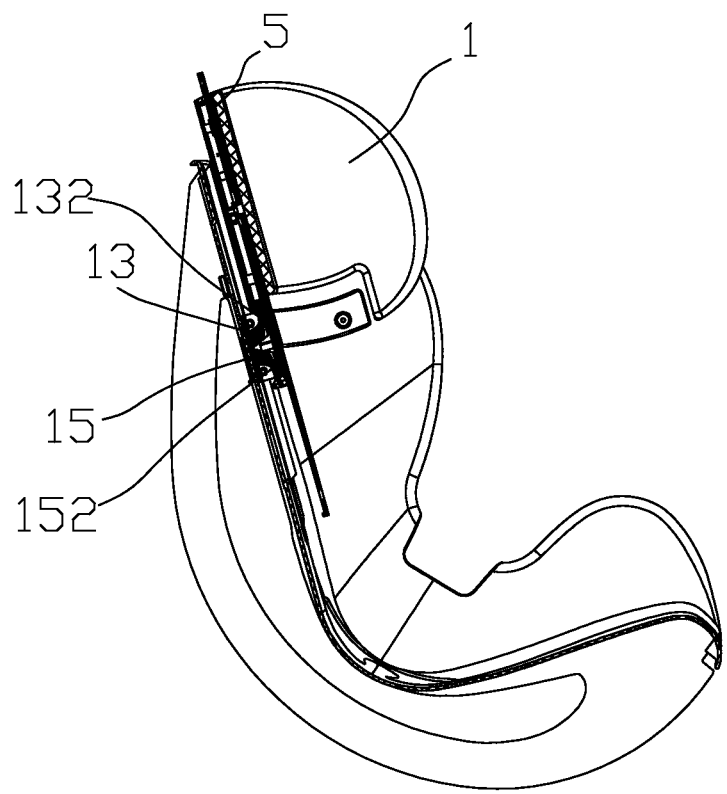
FIG. 7 is a side view in part section of the child safety seat.
Figure 8:
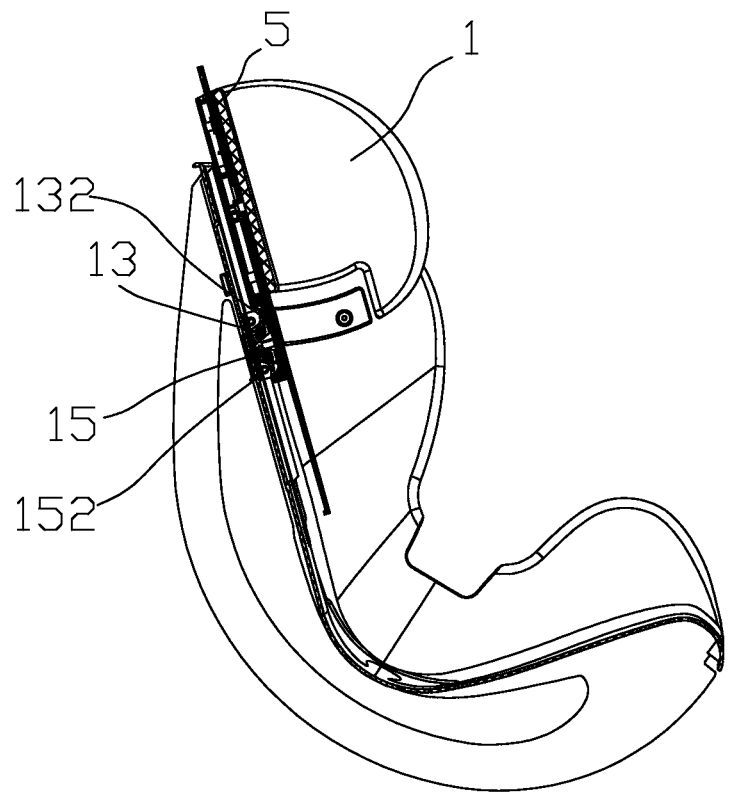
FIG. 8 is a view similar to FIG. 7 with the adjustment handle pulled up.
Figure 9:
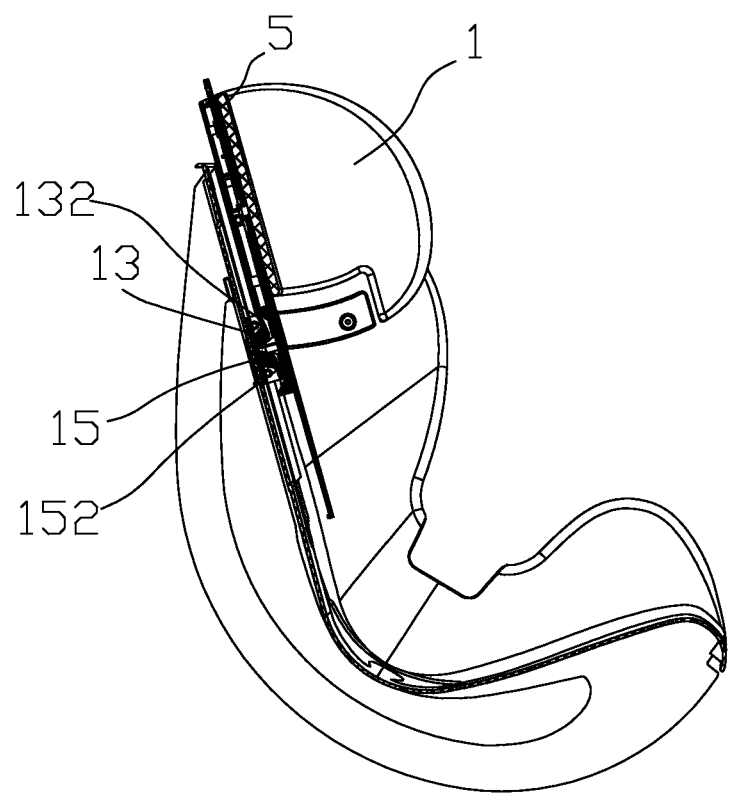
FIG. 9 is a view similar to FIG. 7 with the adjustment handle pushed down.
Figure 10:
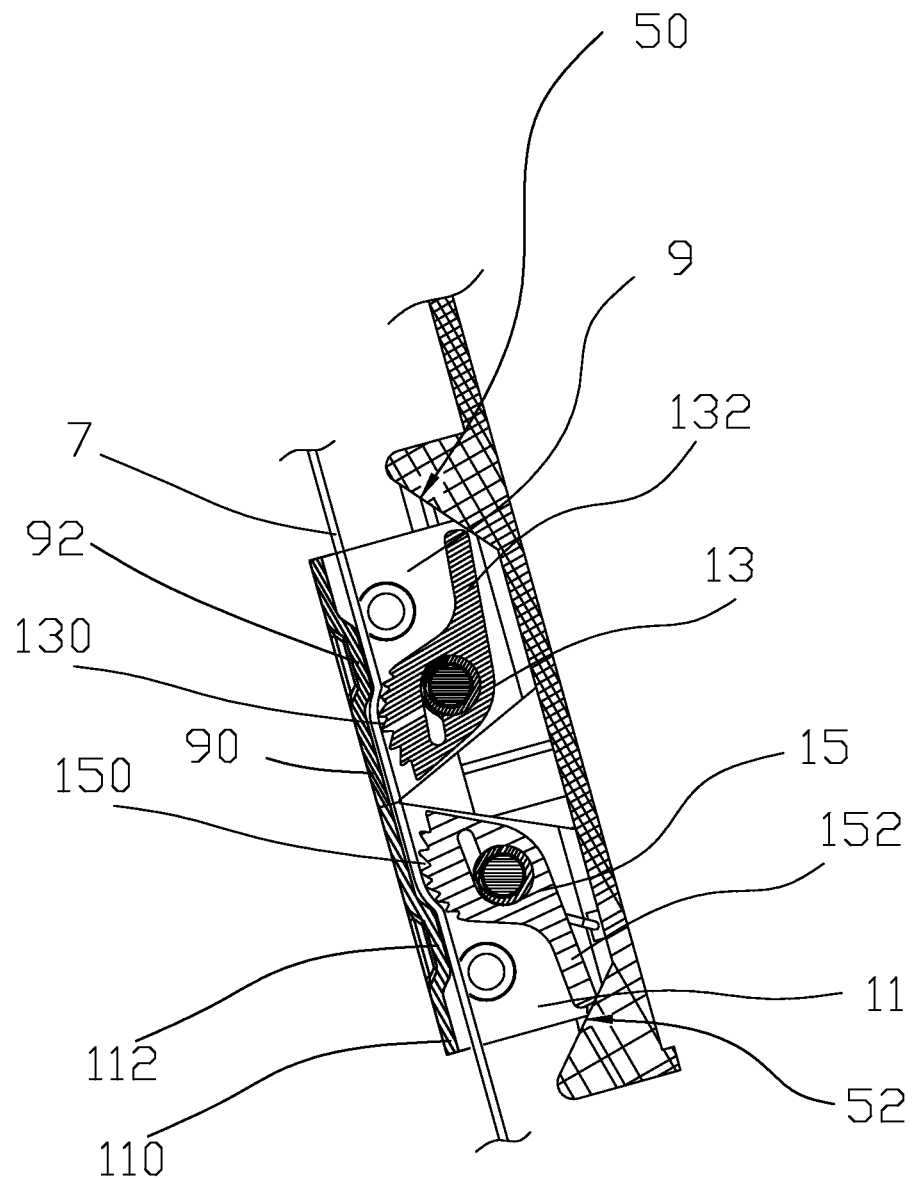
FIG. 10 is a longitudinal sectional view showing the belt member and the first and second retaining members cooperating with the adjustment handle of FIG. 7.
Figure 11:
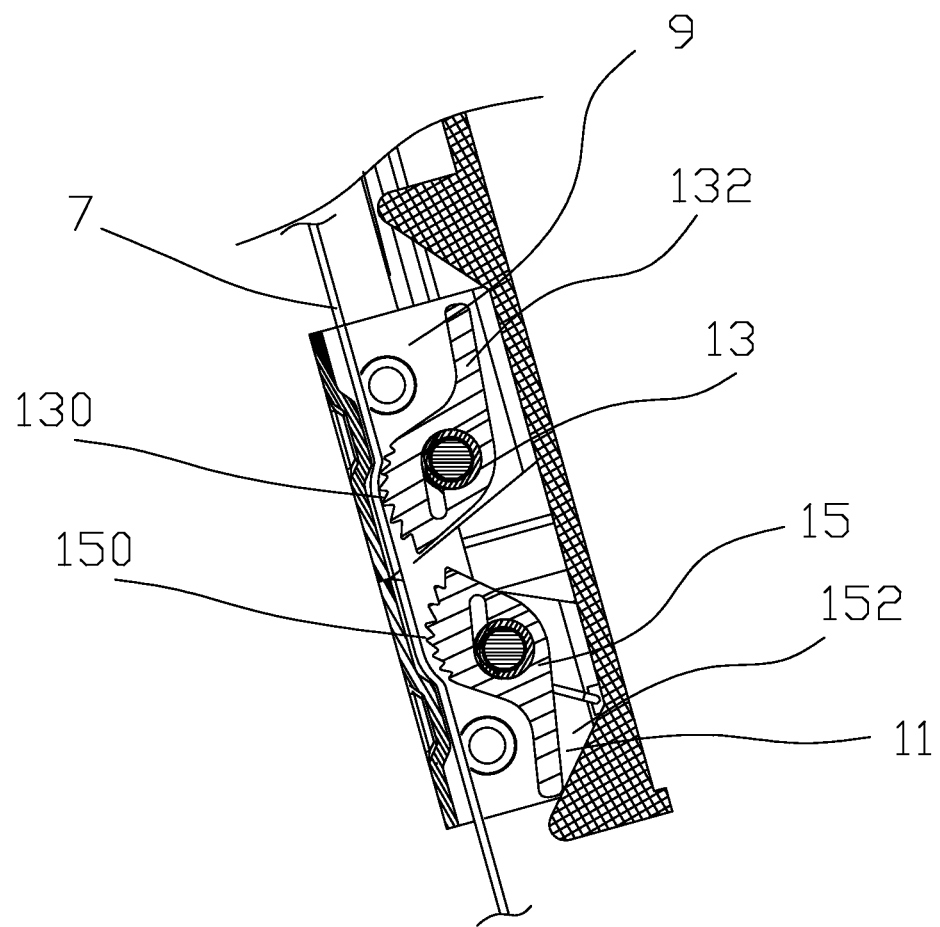
FIG. 11 is a longitudinal sectional view showing the belt member and the first and second retaining members cooperating with the adjustment handle of FIG. 8.

It is noted that left side of FIG. 1 is the left side view of the child safety seat of the invention, the right side of FIG. 1 is the right side view of the child safety seat of the invention, the top of FIG. 1 is the top view of the child safety seat of the invention, the bottom of the FIG. 1 is the bottom view of the child safety seat of the invention, the left side of FIG. 7 is the left side view of the child safety seat of the invention, and the right side of FIG. 7 is the right side view of the child safety seat of the invention.

Referring to FIGS. 1 to 11, a child safety seat in accordance with the invention comprises a backrest 3 and a headrest 1. On the back of the backrest 3 there are provided two spaced, rectangular, parallel recesses 30. The headrest 1 includes a downward extending, rectangular sliding plate 10 slidably disposed in the recesses 30.

A cover plate 8 is provided and threadedly secured to the back of the headrest 1. An adjustment handle 5 is slidably secured to the headrest 1 and includes, on a narrow lower portion of its back, a first wedge 50 and an opposite second wedge 52.

An elongated, rectangular belt member 7 has a bottom end secured to the backrest 3 and a top end secured to the cover plate 8. A first retaining member 9 and a second retaining member 11 are provided proximate a lower edge of the cover plate 8 and fastened by and between the first and second wedges 50, 52. A first adjustment member 13, a first torsion spring 17, and the first retaining member 9 are pivotably fastened together by a pivot pin 21. A second adjustment member 15, a second torsion spring 19, and the second retaining member 11 are pivotably fastened together by a pivot pin 23. The belt member 7 is made of flexible material and has a rough surface. Preferably, the belt member 7 is a strap made of a material the same as a strap of the child safety seat or a safety belt of an automobile. This has the advantages of easy selection of material and high quality.

The first adjustment member 13 includes a plurality of first teeth 130 inclined clockwise and the second adjustment member 15 includes a plurality of second teeth 150 inclined counterclockwise opposite to that of the first teeth 130. The belt member 7 passes through a gap between the first teeth 130 and a base 90 of the first retaining member 9, and a gap between the second teeth 150 and a base 110 of the second retaining member 11. A first projection 92 is formed on the base 90 of the first retaining member 9 and a second projection 112 is formed on the base 110 of the second retaining member 11. The belt member 7 is urged by the first teeth 130 so that the first retaining member 9 is prevented from being lowered. And in turn, the cover plate 8 and the headrest 1 are prevented from being lowered. But the first retaining member 9 can be moved upward or downward in response to a force exerted thereon. Also, the belt member 7 is urged by the second teeth 150 so that the second retaining member 11 is prevented from being lifted. And in turn, the cover plate 8 and the headrest 1 are prevented from being lifted. But the second retaining member 11 can be moved upward or downward in response to a force exerted thereon.

A first torsion spring 17 is also pivotably secured to the first retaining member 9, and a second torsion spring 19 is also pivotably secured to the second retaining member 11. The first adjustment member 13 further includes a first lever 132 proximate an inclined surface of the first wedge 50. The second adjustment member 15 further includes a second lever 152 proximate an inclined surface of the second wedge 52.

On the back of the backrest 3 there are provided two fastening plates 27 for threadedly securing the backrest 3 to the headrest 1. The fastening plate 27 has a width greater than that of the recess 30. A distance between the fastening plate 27 and the headrest 1 is about equal to a thickness of the backrest 3. The provision of the fastening plates 27 can prevent the headrest 1 from being vibrated.

The sliding plate 10 is fastened by a back plate 29. The headrest 1 and the back plate 29 are provided in the front and the back of the backrest 3 respectively. The provision of the back plate 29 facilitates the installation of the headrest 1.

Two torsion springs 25 each have one end connected to the adjustment handle 5 and the other end connected to the headrest 1. Without exerting any force on the adjustment handle 5, the adjustment handle 5 can return to its previous position due to the elastic force release of the energized torsion springs 25.

Height adjustment operation of the invention is described in detail below. In an inoperative position, the belt member 7 is retained by the first and second teeth 130, 150. Thus, the headrest 1 remains stationary with respect to the backrest 3. That is, an upward or downward movement of the headrest 1 is not possible which is discussed in detail in paragraph 5 of the detailed description of the invention.

For upward adjusting height of the headrest 1, a user may pull up the adjustment handle 5 to cause the second wedge 52 to push the second lever 152. And in turn, the second adjustment member 15 rotates to disengage the second teeth 150 from the belt member 7. As such, the first and second retaining members 9, 11 are lifted. As a result, the headrest 1 moves upward (see FIGS. 8 and 11).

For downward adjusting height of the headrest 1, a user may push down the adjustment handle 5 to cause the first wedge 50 to push the first lever 132. And in turn, the first adjustment member 13 rotates to disengage the first teeth 130 from the belt member 7. As such, the first and second retaining members 9, 11 are lowed. As a result, the headrest 1 moves downward (see FIG. 9).

It is envisaged by the invention that a downward pushing of the adjustment handle 5 can lower the headrest 1 or an upward pulling of the adjustment handle 5 can lift the headrest 1 in one hand operation. It is very convenient. Further, the headrest 1 of the child safety seat can be positioned in any desired height. Furthermore, the headrest 1 is held secure after the height adjustment.

While the invention has been described in terms of preferred embodiments, those skilled in the art will recognize that the invention can be practiced with modifications within the spirit and scope of the appended claims.

What is claimed is:

1. A child safety seat comprising:
   a backrest (3) including two parallel recesses (30) longitudinally disposed on a back;
   a headrest (1) including a downward extending sliding plate (10) slidably disposed in the recesses (30);
   a cover plate (8) secured to the headrest (1);
   an adjustment handle (5) slidably secured to the headrest (1) and including a first wedge (50) and an opposite second wedge (52) both on a lower portion;
   a belt member (7) having a bottom end secured to the backrest (3) and a top end secured to the cover plate (8);
   first and second retaining members (9, 11) disposed proximate a lower edge of the cover plate (8) and fastened by and between the first and second wedges (50, 52);
   a first adjustment member (13) pivotably secured to the first retaining member (9) and including a plurality of first teeth (130) inclined in a first direction, and a first lever (132) proximate the first wedge (50);
   a second adjustment member (15) pivotably secured to the second retaining member (11) and including a plurality of second teeth (150) inclined in a second direction opposite to the first direction, and a second lever (152) proximate the second wedge (52);
   a first torsion spring (17) pivotably secured to the first retaining member (9); and
   a second torsion spring (19) pivotably secured to the second retaining member (11);

wherein the belt member (7) passes between the first teeth (130) and a base (90) of the first retaining member (9), and between the second teeth (150) and a base (110) of the second retaining member (11).

2. The child safety seat of claim 1, further comprising two fastening plates (27), and wherein the fastening plates (27) and the headrest (1) are disposed on the back of the backrest (3) and a front of the backrest (3) respectively, each of the fastening plates (27) have a width greater than that of each of the recesses (30), and a distance between the fastening plate (27) and the headrest (1) is about equal to a thickness of the backrest (3).

3. The child safety seat of claim 1, further comprising a back plate (29) for fastening the sliding plate (10), and wherein the headrest (1) and the back plate (29) are disposed in a front of the backrest (3) and the back of the backrest (3) respectively.

4. The child safety seat of claim 1, further comprising two torsion springs (25) each having one end connected to the adjustment handle (5) and an other end connected to the headrest (1).

5. The child safety seat of claim 1, wherein the first adjustment member (13) and the first retaining member (9) are pivotably fastened together by a first pivot pin, and the second adjustment member (15) and the second retaining member (11) are pivotably fastened together by a second pivot pin.

6. The child safety seat of claim 1, further comprising a first projection (92) formed on the base (90) of the second retaining member (9) and a second projection (112) formed on the base (110) of the second retaining member (11).

* * * * *